(12) United States Patent
Jamieson et al.

(10) Patent No.: US 6,813,644 B1
(45) Date of Patent: Nov. 2, 2004

(54) DISTRIBUTION OF REACHABILITY INFORMATION IN DATA VIRTUAL PRIVATE NETWORKS

(75) Inventors: Dwight D. Jamieson, Ottawa (CA); Rong R. Wang, Wheeling, IL (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/441,367

(22) Filed: Nov. 17, 1999

(30) Foreign Application Priority Data

Nov. 18, 1998 (CA) ............................................ 2254813

(51) Int. Cl.[7] ........................................... G06F 15/173
(52) U.S. Cl. ..................................................... 709/242
(58) Field of Search ................... 709/238–243

(56) References Cited

U.S. PATENT DOCUMENTS

| | | | |
|---|---|---|---|
| 6,205,488 B1 * | 3/2001 | Casey et al. ................. | 709/238 |
| 6,339,595 B1 * | 1/2002 | Rekhter et al. ............. | 370/392 |
| 6,493,349 B1 * | 12/2002 | Casey ......................... | 370/409 |
| 6,516,417 B1 * | 2/2003 | Pegrum et al. ............. | 713/201 |

OTHER PUBLICATIONS

Li, T., CPE Based VPNs using MPLS, Internet Draft, <draft–li–mpls–vpn–00.txt>, pp. 1–4, Oct. 1998.*
Virtual Private Networks on Vendor Independent Networks, IBM Tech. Disclosure Bulletin, vol. 35, No. 4A, pp. 326–329, Sep. 1, 1992.*
Rosen, E., et al., BGP/MPLS VPNs, RFC–2547, IETF, pp. 1–8, Mar. 1999.*
Heinanen, J., VPN Support for MPLS, draft–heinanen–mpls–wpn–00.txt, IETF, pp. 1–5, Dec. 1997.*
Redford, R., Enabling Business IP Services with Multiprotocol Label Switching, Cisco Systems, pp. 1–12, Jan. 1999.*
Muthukrishnan, K., et al., Core IP VPN Architecture, Internet Draft, draft–muthukrishnan–corevpn–arch–00.txt, IETF, pp. 1–9, Oct. 2, 1998.*
Jamieson, D., et al., MPLS VPN Architecture, Internet Draft, draft–jamieson–mpls–vpn–00.txt, IETF, pp. 1–16, Aug. 1998.*
Heinanen, J. et al., VPN Support for MPLS, draft–heinanen–mpls–wpn–01.txt, IETF, pp. 1–8, Mar. 1998.*
Gleeson, B., et al., A Framework for IP Based Virtual Private Networks, Internet Draft, draft–gleeson–vpn–framework–00.txt, IET pp. 1–47, Sep. 1998.*

* cited by examiner

Primary Examiner—Andrew Caldwell
(74) Attorney, Agent, or Firm—Matthew Vella

(57) ABSTRACT

In methods and apparatus for acquiring VPN reachability information at a node of a data network, a VPN reachability information request is transmitted from a requesting node. The VPN reachability information request comprises a VPN identifier. Other nodes of the data network receive the VPN reachability information request and, if they have reachability information relevant to that VPN, they transmit such information to the requesting node where it is received and stored. The invention can be used in MPLS VPN architectures.

28 Claims, 14 Drawing Sheets

VPN request; first CPE request for VPN

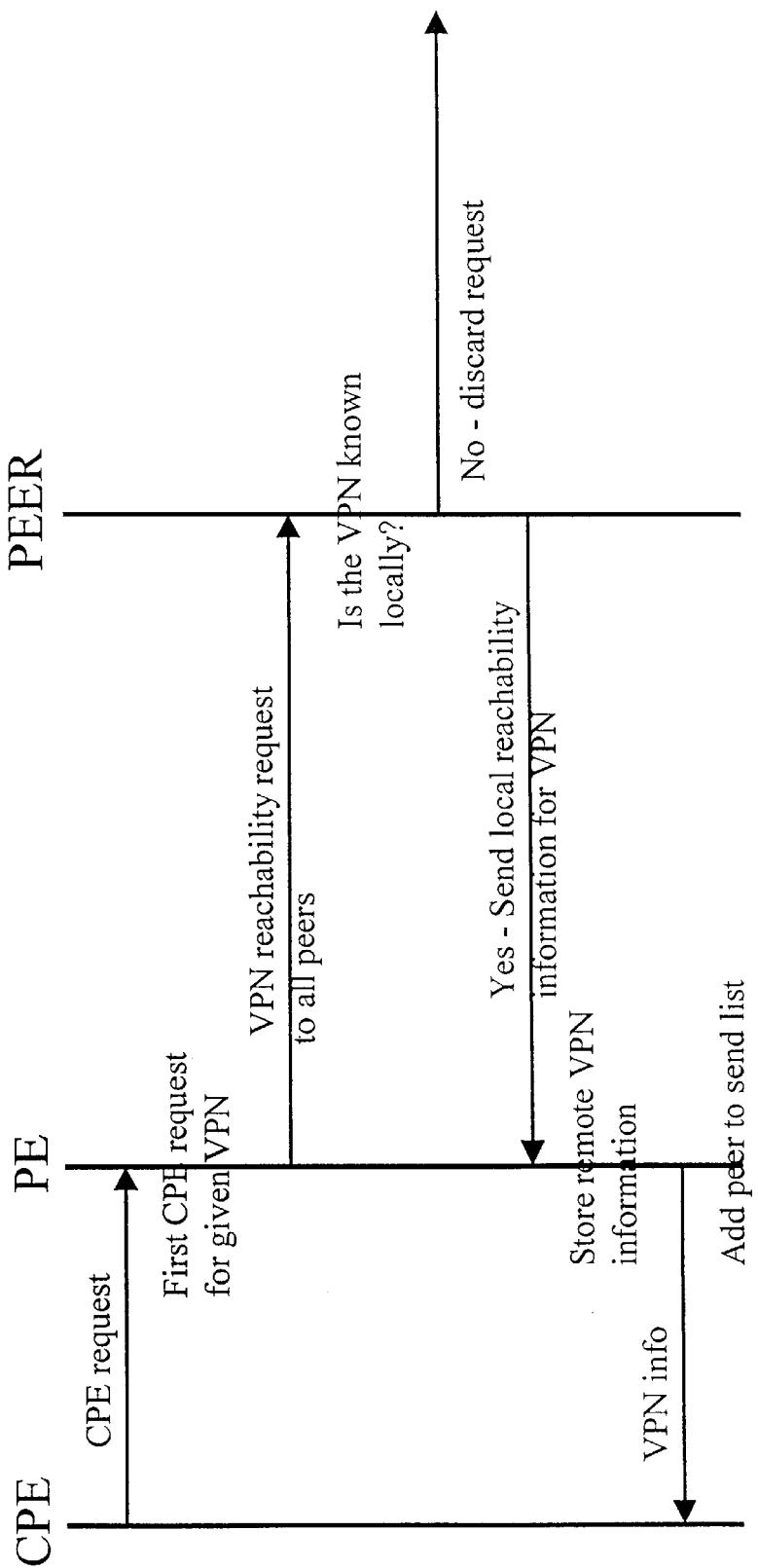
FIG. 5A  VPN request; first CPE request for VPN

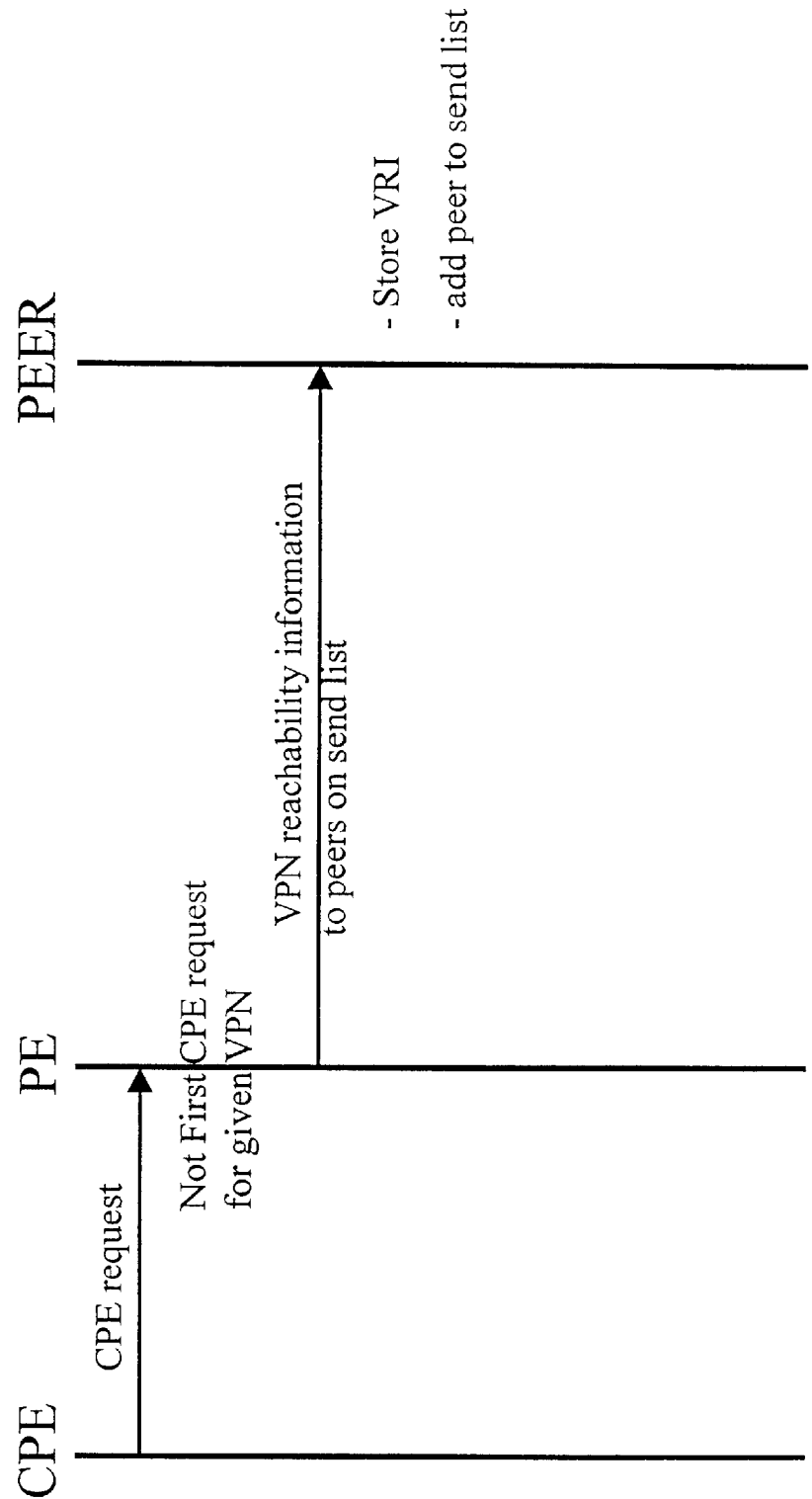
FIG.5B VPN request; not the first CPE request for VPN

DISTRIBUTION OF REACHABILITY INFORMATION IN DATA VIRTUAL PRIVATE NETWORKS

FIELD OF THE INVENTION

This invention relates to distribution of reachability information in Virtual Private Networks (VPNs).

BACKGROUND OF THE INVENTION

A typical Internet network implementation comprises a Service Provider Network (SPN) connected to a plurality of customer data facilities, commonly referred to as Customer Premises Equipment (CPE). The SPN is operated by an Internet Service Provider (ISP), and comprises a network Provider Edge (PE) nodes (for example, routers and/or IP switches). Each PE node is connected to one or more instances of CPE by access links. The PE nodes are connected within the SPN directly, via other nodes and via route reflectors. Each CPE may comprise a computer or network of computers operated by a customer, the computers being interconnected, for example, by a Local Area Network (LAN). Virtual Private Networks. A VPN is an emulated multi-site wide area routed network using IP facilities which are operated and implemented by an Internet Service Provider (ISP). Thus an SPN can be used to "connect" CPE across multiple sites. These "connections" are shared in the sense that the same PE nodes can be used to connect the CPE of more than one customer. Typically, a VPN is operated by establishing tunnels between Provider Edge (PE) devices supporting the sites of a VPN.

The Internet Engineering Task Force (IETF) is an industry consortium which seeks to define standards for implementation of Internet networks. Participants submit Internet Drafts to the IETF for discussion in working groups. Some proposals contained in Internet Drafts may eventually be adopted as standards by the IETF. Copies of Internet Drafts are available at Internet address ftp://frp.ietf.org/internet-drafts.

Recent IETF drafts make proposals concerning the implementation of Virtual Private Networks (VPNs) in SPNs using Multi-Protocol Label Switching (MPLS). Such drafts include:

{1} J. Heinanen et al, "VPN Support with MPLS", <draft-heinanen-mpls-vpn-01.txt>, March 1998.

{2} D. Jamieson et al, "MPLS VPN Architecture", <draft-jamieson-mpls-vpn-00.txt>, August 1998.

{3} T. Li, "CPE Based VPNs using MPLS", <draft-li-mpls-vpn-00.txt>, October 1998.

{4} E. Rosen et al, "BGP/MPLS VPNs", <draft-rosen-vpn-mpls-00.txt>, November 1998.

To implement VPNs on SPNs using MPLS, {3} proposes that a CPE will transmit a Border Gateway Protocol (BGP) message to the SPN to indicate its presence in the network and to indicate the set of VPNs in which the CPE wants to participate. The BGP message includes "VPN reachability information", including the CPE's address in the ISP's address space and a VPN identifier.

The BGP message is received by the PE node which is connected to the CPE. The PE node can filter or otherwise examine the message to ensure that it complies with the ISP's policies. If the message does comply with the ISP's policies, the message is propagated to other PE nodes of the SPN according to the specifications of BGP (see IETF document RFC 1771).

The other PE nodes of the SPN store the VPN reachability information and forward the BGP message to any of their connected CPE that are participating in the same VPN. The CPE receiving the BGP message can then use MPLS signalling protocol to set up a MPLS tunnel to the CPE which has just joined the VPN. The PE nodes use the stored VPN reachability information to establish the MPLS tunnels.

The method described in {3} requires very little or no intervention by an ISP when a new CPE is added to a VPN. However, in a large SPN which supports a large number of VPN subscribers, each PE node of the SPN would be required to store a very large amount of VPN reachability information. Moreover, only a small percentage of the stored VPN reachability information may actually be needed by any particular PE node.

For example, in an SPN having 2000 PE nodes and 1000 VPN interfaces per PE node with an average of 10 sites per VPN, 2 million VPN reachability information records would be distributed to each PE node. Assuming conservatively that each VPN reachability information record requires 30 bytes of storage, the VPN reachability information would require 60 Mbytes of storage at each PE node. However, according to the above assumptions, only 10,000 of the stored VPN reachability information records would actually be used by a typical PE node to establish VPN tunnels. The remaining 1.99 million of the 2 million reachability information records, stored at a typical PE node, i.e. 99.5% of the stored records, would not be used.

{4} proposes that PE nodes transmitting BGP messages apply outbound filtering so as not to propagate VPN reachability information to other PE nodes which are not participating in the VPN identified in the BGP message. Alternatively, {4} proposes that PE nodes receiving BGP messages apply inbound filtering so as not to store VPN reachability information for VPNs in which they are not participating. These filtering approaches may address the storage inefficiencies noted above. However, should CPE requiring access to a particular VPN be connected to a PE node not previously participating in that VPN, such filtering would result in the PE node lacking VPN reachability information for that VPN. The required VPN reachability information would need to be provided to the PE node, either by operator provisioning or by dropping and re-establishing the connection between the PE node and other PE nodes of the SPN so that all other PE nodes of the SPN automatically transmit all of their accumulated VPN reachability information to the PE node. The former method for acquiring the required VPN reachability information is time-consuming, error-prone and expensive. In a large network, the latter method for acquiring the required VPN reachability information would take too long and have too great an impact on SPN performance to be acceptable.

SUMMARY OF THE INVENTION

The invention seeks to reduce or eliminate the above problems by enabling a particular PE node to solicit specified VPN reachability information from other PE nodes when such information is needed at the particular PE node. Preferred embodiments of the invention will be described which present a scalable solution which reduces the storage requirements at each node and which can co-exist with existing equipment.

One aspect of the invention provides a method for distributing VPN reachability information in a data network. The method comprises transmitting a VPN reachability information request from a requesting node of the data network to another node of the data network, the VPN reachability information request comprising a VPN identifier. The method further comprises receiving the VPN reachability information request at another node of the data network; retrieving VPN reachability information associated with the VPN identifier at the other node; transmitting the retrieved VPN reachability information from the other node to the requesting node; and receiving the transmitted VPN reachability information at the requesting node.

Another aspect of the invention provides a method for acquiring VPN reachability information at a node of a data network. The method comprises transmitting a VPN reachability information request from the node, the VPN reachability information request comprising a VPN identifier. The method further comprises receiving VPN reachability information at the node.

Yet another aspect of the invention provides a method for providing VPN reachability information at a node of a data network. The method comprises receiving a VPN reachability information request at the node, the VPN reachability information request comprising a VPN identifier. The method further comprises retrieving VPN reachability information associated with the VPN identifier at the node; and transmitting retrieved VPN reachability information from the node.

The methods as defined above enable a node in a data network to acquire VPN reachability information when it is required without unduly disrupting operation of the data network. Because the VPN reachability information is acquired at the node only when required, storage of large quantities of unneeded VPN reachability information at the data node is avoided, enabling cost reduction of the data node.

Modifications to the operation of route reflectors in data networks provide further benefits. In particular, by enabling route reflectors to filter VPN reachability information so that it is provided only to client peer nodes nodes participating in the VPNs to which the reachability information applies, processing and storage at non-participating peer nodes can be reduced.

Thus, another aspect of the invention provides a method for operating a route reflector in a data network. The method comprises receiving VPN reachability information from particular client peer node connected to the route reflector, the VPN reachability information including a VPN identifier identifying a particular VPN. The method further comprises reflecting the received VPN reachability information to all non-client peer nodes connected to the route reflector; reflecting the received VPN reachability information to all non-solicit-capable client peer nodes connected to the route reflector; and reflecting the received VPN reachability information to only those solicit-capable peer nodes connected to the route reflector which are currently participating in the particular VPN.

Another aspect of the invention provides a method for operating a route reflector in a data network, comprising receiving VPN reachability information from a non-client peer node connected to the route reflector, the VPN reachability information including a VPN identifier identifying a particular VPN; reflecting the received VPN reachability information to all non-solicit-capable client peer nodes connected to the route reflector; and reflecting the received VPN reachability information to only those solicit-capable peer nodes connected to the route reflector which are currently participating in the particular VPN.

Yet another aspect of the invention provides a method for operating a route reflector in a data network, comprising receiving VPN reachability information from an external node connected to the route reflector, the VPN reachability information including a VPN identifier identifying a particular VPN; reflecting the received VPN reachability information to all non-client peer nodes connected to the route reflector; reflecting the received VPN reachability information to all non-solicit-capable client peer nodes connected to the route reflector; and reflecting the received VPN reachability information to only those solicit-capable peer nodes connected to the route reflector which are currently participating in the particular VPN.

Another aspect of the invention provides a method for distributing VPN reachability information in a data network. The method comprises maintaining at a node of the data network a VPN send list for each VPN in which the node currently participates, the VPN send list for a particular VPN identifying peer nodes of the node which also participate in that particular VPN. Upon receipt of VPN reachability information for the particular VPN, the node transmits that VPN information only to peer nodes on the VPN send list for the particular VPN.

Another aspect of the invention provides a data network, comprising a plurality of nodes. Each node comprises means for transmitting a VPN reachability information request to another node of the data network, the VPN reachability information request comprising a VPN identifier; means for receiving a VPN reachability information request from another node of the data network; means for retrieving VPN reachability information associated with a VPN identifier in a received VPN reachability information request; means for transmitting retrieved VPN reachability information to another node of the data network; and means for receiving VPN reachability information from another node of the data network.

Another aspect of the invention provides a node for a data network, comprising means for transmitting a VPN reachability information request, the VPN reachability information request comprising a VPN identifier; and means for receiving VPN reachability information.

Yet another aspect provides a node for a data network, comprising means for receiving a VPN reachability information request, the VPN reachability information request comprising a VPN identifier; means for retrieving VPN reachability information associated with the VPN identifier; and means for transmitting retrieved VPN reachability information.

Another aspect of the invention provides a route reflector for a data network, comprising means for receiving VPN reachability information from particular client peer node connected to the route reflector, the VPN reachability information including a VPN identifier identifying a particular VPN; means for reflecting the received VPN reachability information to all non-client peer nodes connected to the route reflector; means for reflecting the received VPN reachability information to all non-solicit-capable client peer nodes connected to the route reflector; and means for reflecting the received VPN reachability information to only those solicit-capable peer nodes connected to the route reflector which are currently participating in the particular VPN.

Another aspect of the invention provides a route reflector for a data network, comprising means for receiving VPN reachability information from a non-client peer node connected to the route reflector, the VPN reachability information including a VPN identifier identifying a particular VPN; means for reflecting the received VPN reachability information to all non-solicit-capable client peer nodes connected to the route reflector; and means for reflecting the received VPN reachability information to only those solicit-capable peer nodes connected to the route reflector which are currently participating in the particular VPN.

Yet another aspect of the invention provides a route reflector for a data network, comprising means for receiving VPN reachability information from an external peer node connected to the route reflector, the VPN reachability information including a VPN identifier identifying a particular VPN; means for reflecting the received VPN reachability information to all non-client peer nodes connected to the route reflector; means for reflecting the received VPN reachability information to all non-solicit-capable client peer nodes connected to the route reflector; and means for reflecting the received VPN reachability information to only those solicit-capable peer nodes connected to the route reflector which are currently participating in the particular VPN.

Another aspect of the invention provides a node for a data network. The node comprises means for maintaining a VPN send list for each VPN in which the node currently participates, the VPN send list for a particular VPN identifying peer nodes of the node which also participate in that particular VPN. The node further comprises means for transmitting that VPN information only to peer nodes on the VPN send list for the particular VPN upon receipt of VPN reachability information for the particular VPN.

Yet another aspect of the invention provides a PE node comprising:
(i) connections to peers;
(ii) links to other nodes, send other nodes associated with particular VPNs;
(iii) a first data structure of links for each VPN; and
(iv) a second data structure comprising a send list database, an adj-RIB-Out database and an adj-RIB-In database for each VPN.

Advantageously, embodiments of the invention can be introduced into existing networks via software upgrades to existing PE nodes. For example, another aspect of the invention provides computer-readable medium containing a computer program that when loaded into a node of a data network, the node comprising hardware and software and for establishing connections to one or more other nodes, instructs the node to distribute VPN reachability information according to the steps of:
receiving a VPN reachability information request at the node, the VPN reachability information request comprising a VPN identifier;
retrieving VPN reachability information associated with the VPN identifier at the node; and
transmitting retrieved VPN reachability information from the node.

Yet another aspect of the invention provides computer-readable medium containing a computer program that when loaded into a route reflector in a data network, the instructs the route reflector to distribute VPN reachability information according to the steps of:
receiving VPN reachability information from particular client peer node connected to the route reflector, the VPN reachability information including a VPN identifier identifying a particular VPN;
reflecting the received VPN reachability information to all non-client peer nodes connected to the route reflector;
reflecting the received VPN reachability information to all non-solicit-capable client peer nodes connected to the route reflector; and
reflecting the received VPN reachability information to only those solicit-capable peer nodes connected to the route reflector which are currently participating in the particular VPN.

Another aspect of the invention provides a computer-readable medium containing a computer program that when loaded into a node of a data network, the node comprising hardware and software and for establishing connections to one or more other nodes, instructs the node to distribute VPN reachability information according to the steps of:
maintaining at a node of the data network a VPN send list for each VPN in which the node currently participates, the VPN send list for a particular VPN identifying peer nodes of the node which also participate in that particular VPN; and
upon receipt of VPN reachability information for the particular VPN, transmitting that VPN information only to peer nodes on the VPN send list for the particular VPN.

BRIEF DESCRIPTION OF THE DRAWINGS

Embodiments of the invention are described below with reference to the accompanying drawings, by way of example only. In the drawings:

FIGS. 5a and 5b are message flow diagrams showing message flows resulting in distribution of VPN reachability information;

DETAILED DESCRIPTION OF EMBODIMENTS

Figure 1:
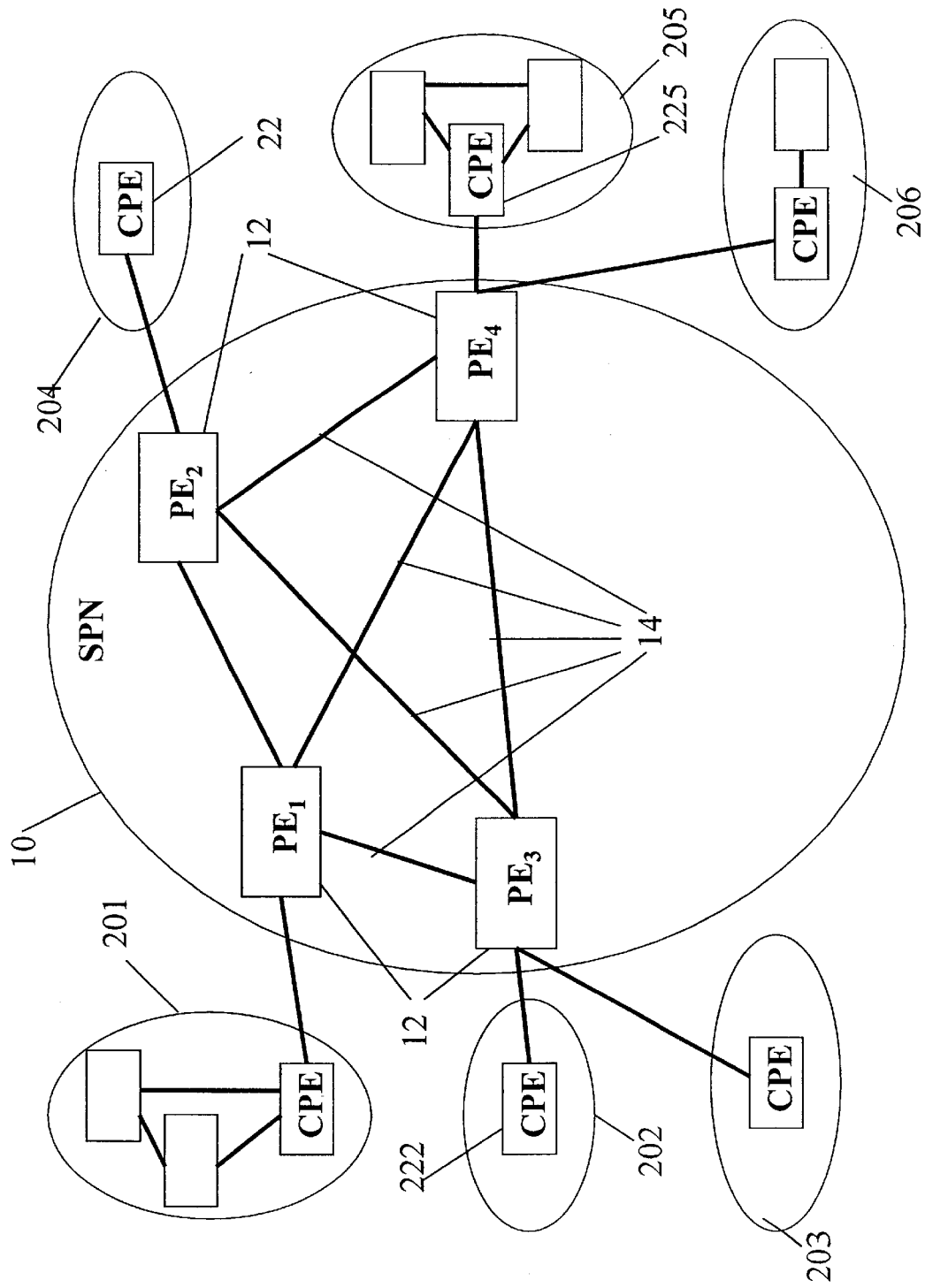
FIG. 1 is a block schematic diagram of a data network embodying a first implementation of the invention.

FIG. 1 is a block schematic diagram of a data network embodying a first implementation of the invention. The data network comprises a Service Provider Network (SPN) 10 connected to a plurality of customer networks 202–206. The SPN 10 comprises a plurality of Provider Edge (PE) nodes 12 which are peered, for example, by connections 14. Each PE node 12 of the SPN 10 is connected to one or more Customer Premises Equipment CPE units of one or more customer network.

A typical customer has data networks at multiple sites and contracts with the service provider to link those sites via the SPN 10 to form a VPN for that customer. For the example illustrated in FIG. 1, customer 1 links customer networks 203 and 205 via $PE_3$ and $PE_4$ of the SPN 10; and customer 2 links customer networks 202 and 206via the same $PE_3$ and $PE_4$ of the SPN 10. Because $PE_3$ and $PE_4$ of the SPN 10 are shared, the connections constitute Virtual Private Networks (VPNs).

In a Multi-Protocol Label Switching (MPLS) network, the PE nodes require VPN reachability information to establish MPLS tunnels corresponding to VPN connections. As described above, in previously proposed MPLS VPN architectures, the PE nodes are each required to store a full set of VPN reachability information, only a small proportion of which is used at any one PE node.

In this description, the term "VPN Reachability Information" will be abbreviated to "VRI" for convenience.

In the SPN 10 constructed according to an embodiment of the invention, at least some of the PE nodes 12 are "solicit-capable"—i.e. they are provided with functionality that enables them to request VRI when they need it without unduly disrupting operation of the SPN 10.

Figure 13:
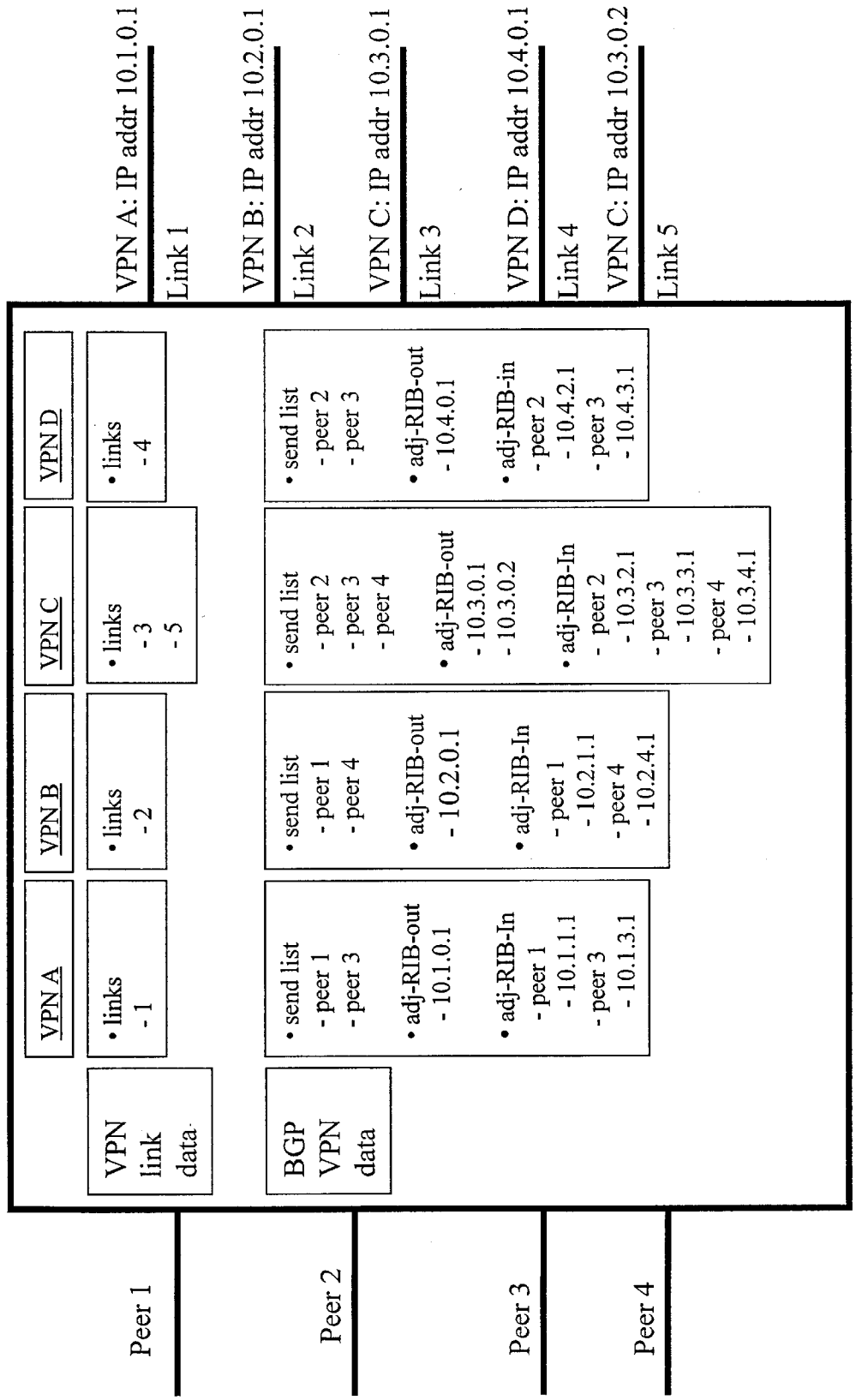
FIG. 13 illustrates an example of the internal data structures maintained by each PE node for each VPN, according to an embodiment of the invention.

FIG. 13 illustrates an example of the internal data structures maintained by each PE node for each VPN, according to an embodiment of the invention. In this example, the PE is assumed to have connections to 4 peers (labelled as Peers 1–4 at the left of the drawing) and 5 CPE's (labelled as Links 1–5 at the right of the drawing). Furthermore, the PE supports 4 VPN's (labelled as VPN A, B, C, and D). There is a VPN associated with each Link (with a separate IP address). Note that VPN's may be supported over multiple links. In this example the PE supports VPN C across two separate Links, as shown in FIG. 15, with VPN C associated with both Link 3 (at IP address 10.3.0.1) and Link 5(at IP address 10.3.0.2). In FIG. 13, there are two main data structures: VPN Link data, which contains a database of which VPN's are associated with which links; and BGP VPN data, which contains three databases for each VPN: a send list, an adj-RIB-out database and an adj-RIB-In database.

Send List is a set of peers which are known to participation in a given VPN. When there is a change in VPN information on a PE, the send list is used to distribute the changes to the appropriate peers.

As is known, adj-RIB-In is a database which contains the VRIs learned from peers. It is organized to associated the VRIs with the peer from which they are learned.

Also as is known, adj-RIB-Out is a database which contains the VRIs to be sent to peers.

Note that the data structures are illustrated as being organized by VPN. This facilitates the ability to manage the databases so that only relevant entries are maintained, and so that routing tables can be created and maintained per VPN. Advantageously, different policies can be applied on a per VPN basis. Furthermore, this organization (by VPN) allows each PE node to notify PEERs (via its adj-RIB-out table) on a VPN basis.

Figure 2:
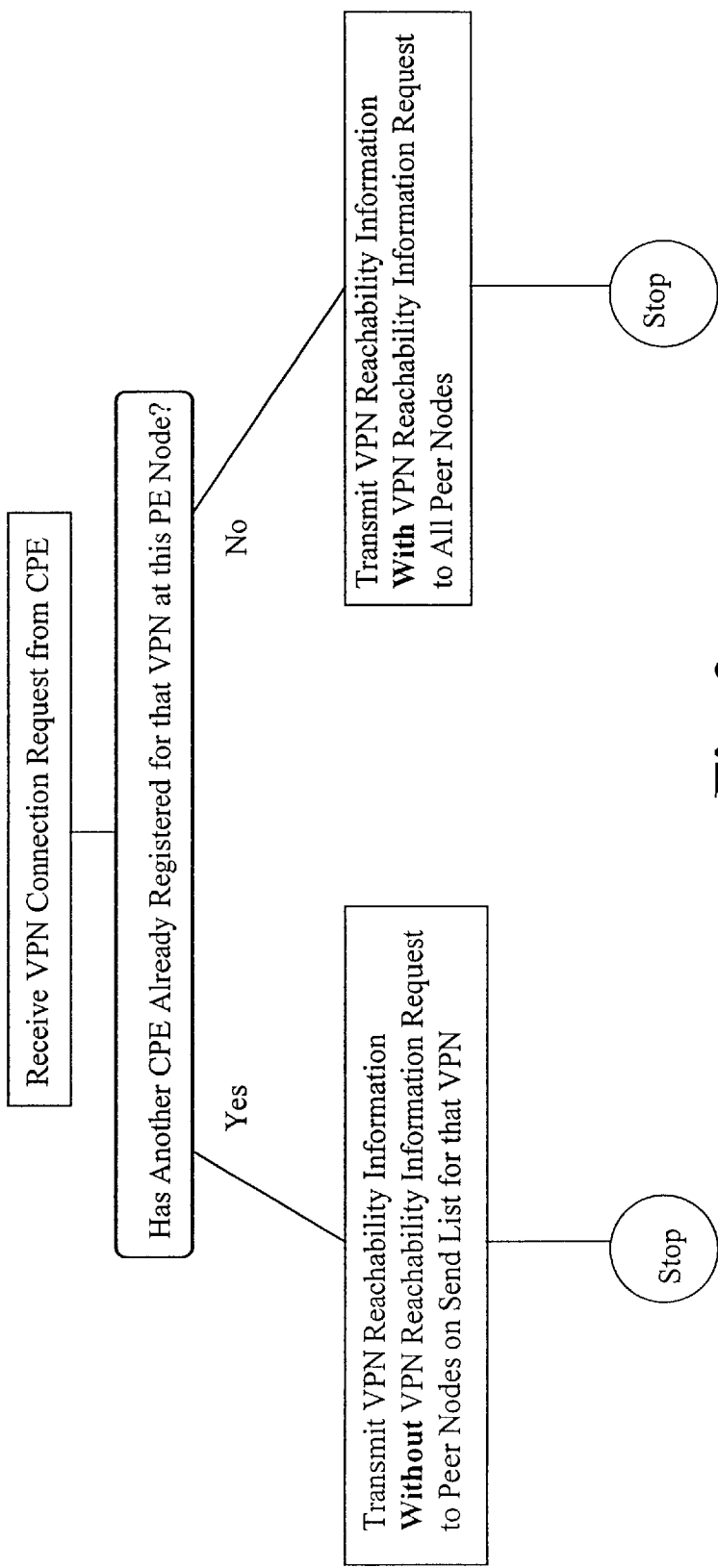
FIG. 2 is a flow chart showing steps in a process performed by a solicit-capable PE node on receipt of a VPN connection request from CPE.

FIG. 2 is a flow chart showing steps in a process performed by a solicit-capable PE node on receipt of a VPN connection request (from a CPE or from the NCU for FIG. 12), the connection request specifying a VPN identifier for the VPN in which the CPE wishes to participate. The PE node determines whether it already has another CPE registered for that VPN. If the PE node has another CPE registered for that VPN, it already has the required VRI and it has a send list identifying all peer nodes participating in that VPN. Consequently, it transmits VRI received from the CPE with the VPN connection request to peer nodes on the send list for that VPN without requesting further VRI.

If, however, the PE node does not have the required VRI, it transmits the VRI received with the VPN connection request together with specified overhead bits set to indicate that further VRI is required for that VPN to all peer nodes. The resulting message acts as a VRI request.

Figure 3:
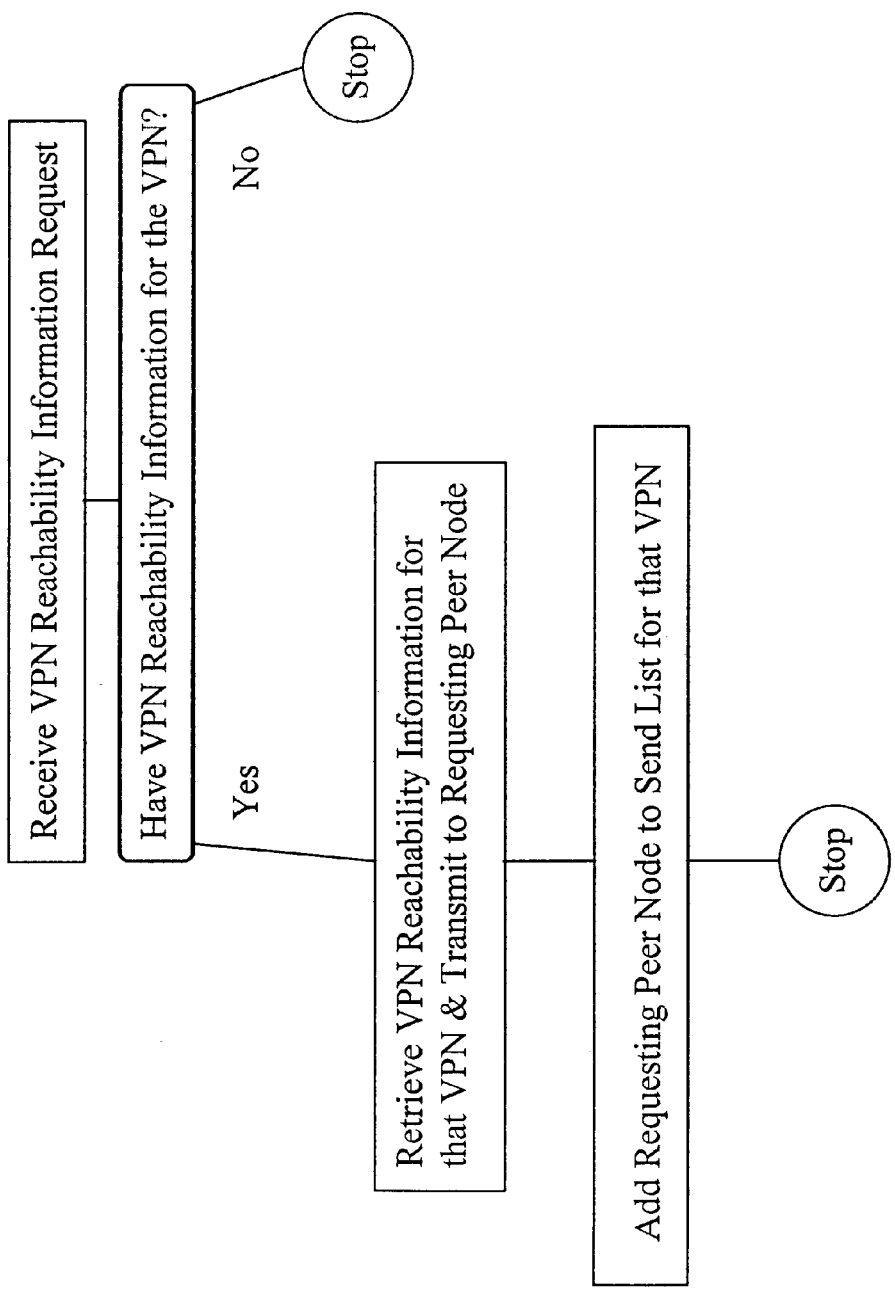
FIG. 3 is a flow chart showing steps in a process performed by a solicit-capable PE node on receipt of a VPN reachability information request.

FIG. 3 is a flow chart showing steps in a process performed by a solicit-capable PE node on receipt of a VPN reachability information request. The PE node determines whether it has VRI for that VPN. If the PE node has the requested VRI, it retrieves the VRI and transmits it to the requesting peer node. The PE node receiving the VRI request also adds the requesting peer node to the send list for that VPN.

Figure 4:
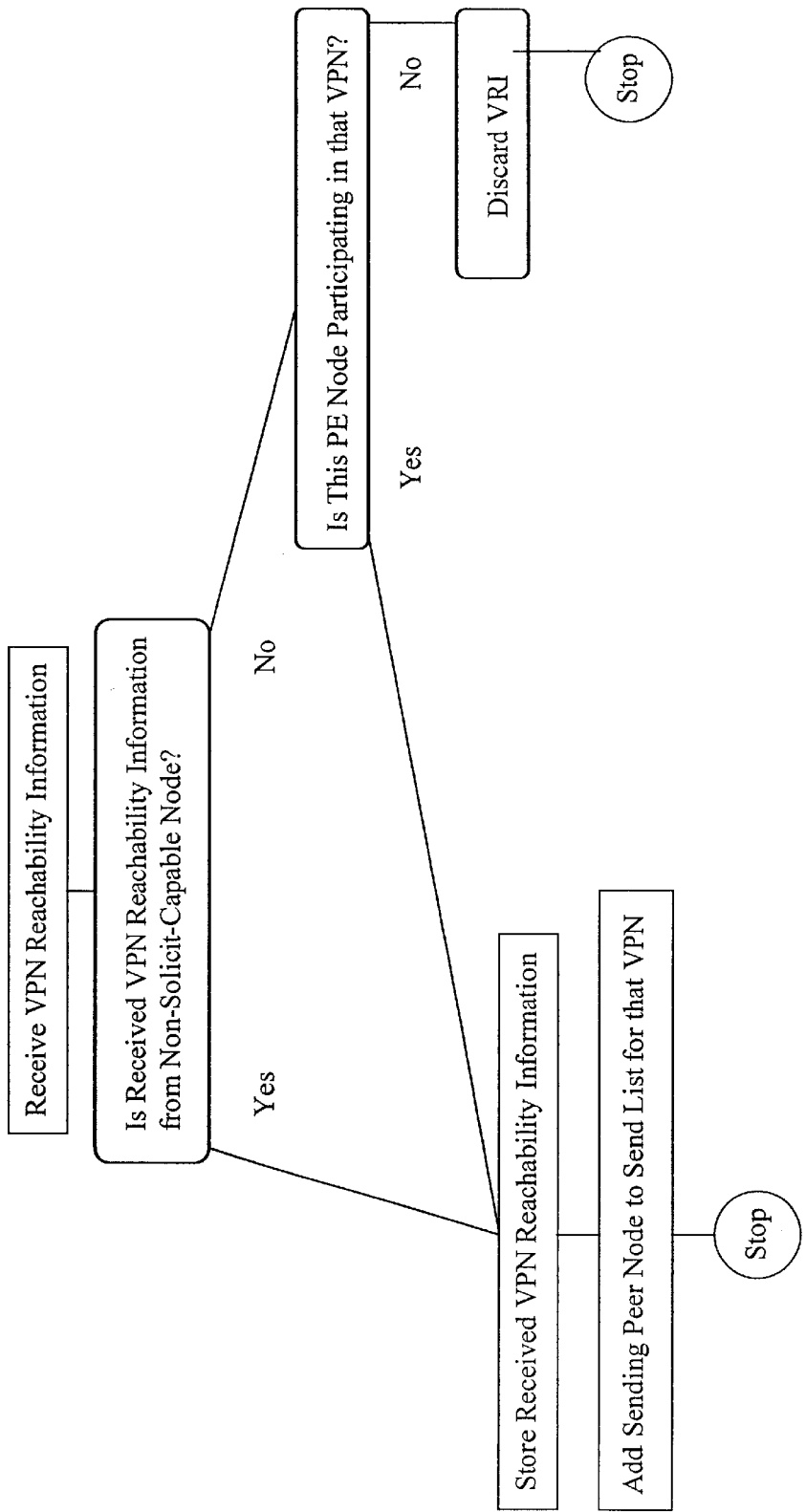
FIG. 4 is a flow chart showing steps in a process performed by a solicit-capable PE node on receipt of VPN reachability information.

FIG. 4 is a flow chart showing steps in a process performed by a solicit-capable PE node on receipt of VPN reachability information. If the VRI is received from a non-solicit-capable PE node, the PE node stores the VRI for possible future use. If the VRI is received from a solicit-capable PE node, the receiving PE node stores the VRI only if it is currently participating in that VPN. The PE node adds the sending peer node to the send list for that VPN.

FIG. 5a is a message flow diagram showing how the processes of FIGS. 2 and 3 work together to provide message flows which result in distribution of VPN reachability information in FIG. 5a. The CPE sends a VPN connection request to its PE node. If that PE node was previously unaware of the requested VPN, the PE node sends a VRI request to all other PEER nodes. Each PEER node having knowledge of the VPN sends the VRI local to that peer node back to the requesting PE node. The requesting PE node in turn stores the VRI received from each peer, forwards this information to the requesting CPE, and adds each replying peer to its send list. In FIG. 5b, the VPN is known to the PE. The PE therefore only sends the VRI to its send list peers (without the VPN Reachability Information Request). Each peer which receives this VRI stores it and adds the sending peer to its send list.

Figure 6:
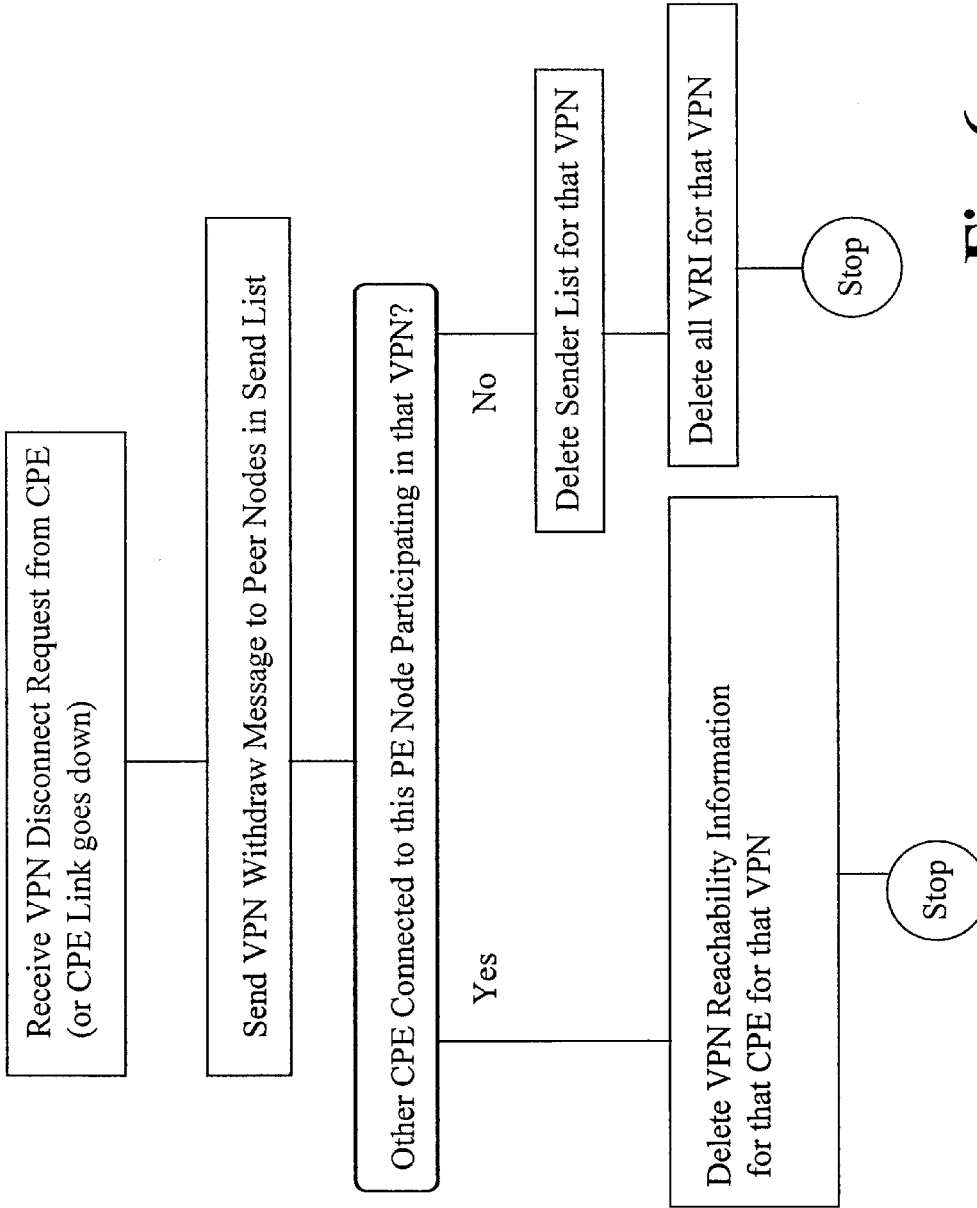
FIG. 6 is a flow chart showing steps in a process performed by a solicit-capable PE node on receipt of a VPN disconnect request from CPE.

FIG. 6 is a flow chart showing steps in a process performed by a solicit-capable PE node on receipt of a VPN disconnect request from CPE (or receipt of an indication that the link to the CPE is discontinued, e.g., from NCU described below). The PEsends a VPN withdraw message to peer nodes in its send list. If the receiving PE node is connected to other CPE participating in that VPN, the sender list for that VPN is still required at that PE node. Therefore, only the adj-RIB-Out VRI (for that CPE for that VPN) is deleted (possibly indirectly via deletion of entries in the rating tables). However, if no other CPE connected to that node is participating in that VPN, the PE node deletes the send list and all VRI (in both adj-RIB-In and adj-RIB-Out) for that VPN. Should that PE node require the VRI for that VPN again in the future, it can request the required VRI using the processes described above.

Figure 7:
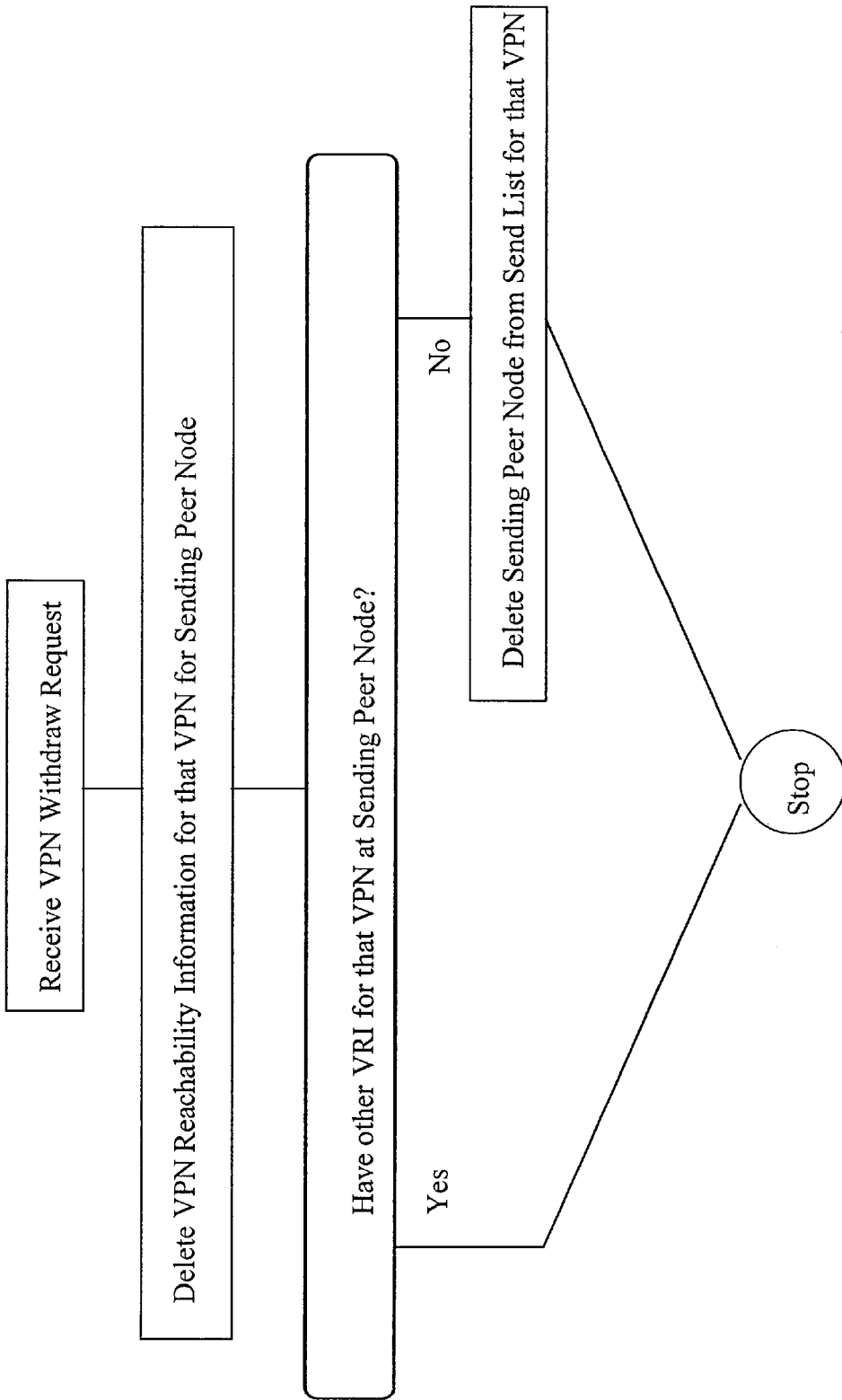
FIG. 7 is flow chart showing steps in a process performed by a solicit-capable PE node on receipt of a VPN withdraw request.

FIG. 7 is flow chart showing steps in a process performed by a solicit-capable PE node on receipt of a VPN withdraw request. The receiving PE node deletes the VRI for the specified VPN specified in the VPN withdraw request from the sending peer node. The PE node also deletes the sending node from the send list for that VPN if it has no other VRI registered for that VPN at the sending peer node.

Figure 8:
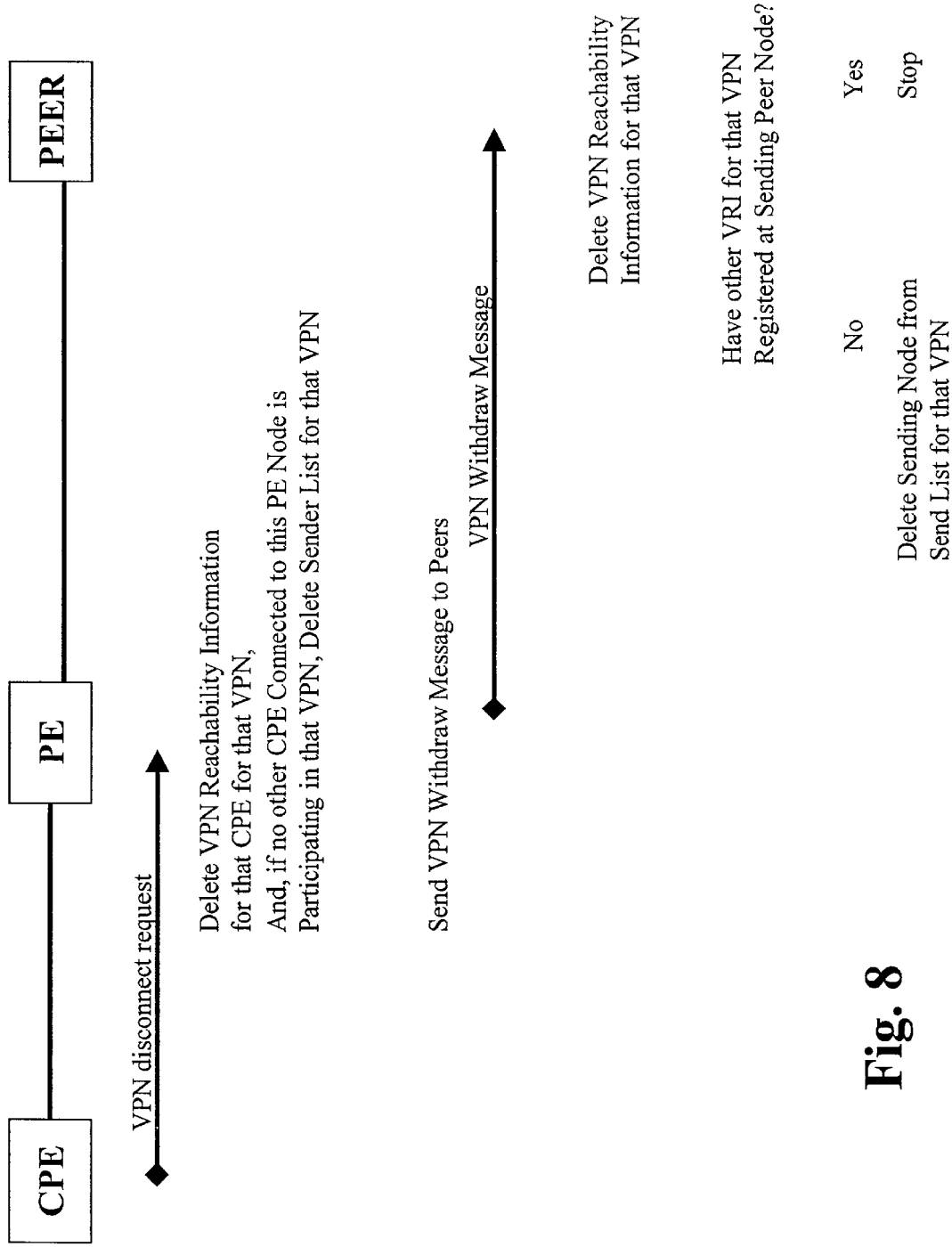
FIG. 8 is a message flow diagram showing message flows resulting in deletion of VPN reachability information.

FIG. 8 is a message flow diagram showing how the processes of FIGS. 6 and 7 work together to provide message flows resulting in deletion of VPN reachability information.

We will now further describe the operation of the above system with reference to a specific example wherein the PE nodes are routers which communicate via BGP. In this example, the following definitions will be helpful:

i) VPN Reachability Information (VRI) includes a BGP route associated with a VPN which contains VPN specific route information.

ii) a solicitation is a request for VRI from an IBGP PE to other IBGP PEs.

iii) in any given network a router can be Solicitation Capable (SC or Non-Solicitation Capable (NSC).

Routers incorporating this embodiment of this invention utilize two new BGP-4 path attributes: Solicitation Request (Type Code 16): and Solicitation Withdraw (Type Code 17).

The Solicitation Request (SOL_REQ) path attribute is an optional transitive attribute of length 0. It is used by a SC PE to solicit VRI from other SC PEs.

The Solicitation Withdraw (SOL_WD) path attribute is an optional transitive attribute of variable length.

The SOL_WD path attribute consists of a list of four octet values, each of which indicates membership withdraw from a particular VPN. Each SOL_WD path attribute is represented by a list of tuples of form <length, VPN identifiers>, where each tuple is encoded as shown below:

| Length (2 octets) |
| VPN identifiers (variable) |

Length—total length of the VPN identifiers in octets VPN identifiers—a list of withdrawing VPN identifiers An UPDATE message that contains the SOL_WD attribute is not required to carry any other path attributes.

The solicitation extension path attributes are not passed to EBGP peers.

The first time a SC PE A advertises a VRI for VPN X, PE A includes a SOL_REQ path attribute along with the VRI. This VRI is distributed to all IBGP peers. It should be noted that subsequent VRIs advertised by PE A for VPN X should not include the SOL_REQ path attribute.

When a SC PE B which supports VPN X receives the VRI originated from PE A (may come from a route reflector), B must distribute all of its LOCAL VRIs associated with VPN X back to the peer from which it received the solicitation.

A SC PE not in VPN X may discard the reachability information from PE A (i.e. does not store it in its Adj-RIB-In).

A NSC PE C receiving PE A's UPDATE message ignores the SOL_REQ path attribute, store the reachability information in its Adj-RIB-In and continue to distribute its VRIs for VPN X to all of its peers. Meanwhile, PE A should store all reachability information from C in its adj-RIB-In regardless whether C participates in the same VPN(s) or not.

When a member of VPN X unsubscribes, a SC PE A will notify all other IBGP peers known to support VPN X. Multiple members of VPN X may be supported by PE A. But if the last member of VPN X is withdrawn from PE A, all other SC PE that support X should stop sending VPN X's VRI to PE A. To withdraw membership from VPN X, a SC PE A may include a SOL_WD path attribute along with the unfeasible route(s) in its UPDATE message. Upon receiving this UPDATE message, a SC PE B withdraws the unfeasible route(s). B also stops sending reachability information related to VPN X to PE A if the last reachability information related to VPN X from PE A has been withdrawn.

Advantageously, the above described system allows a BGP-4 equipped PE node to discard Adj-RIB-In entries that are not relevant and solicit those that are. Furthermore, this architecture allows NSC PE (including route reflectors) to continue supporting the general VPN architecture without any loss of VRI.

Figure 9:
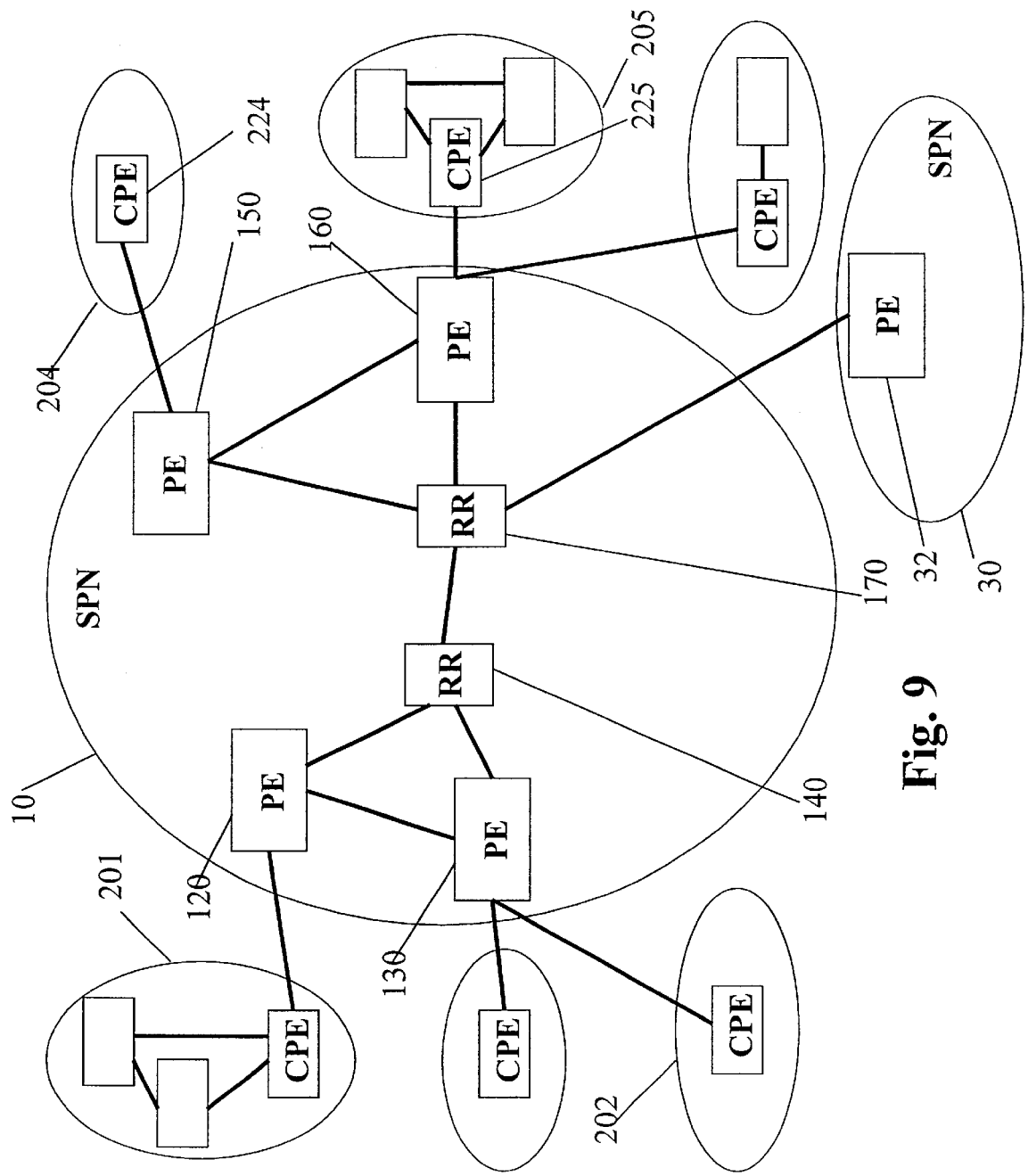
FIG. 9 is a block schematic diagram showing a data network embodying a second implementation of the invention.

FIG. 9 is a block schematic diagram showing a data network embodying a second implementation of the invention. In this embodiment, PE nodes 120, 130 are peered with a route reflector 140, PE nodes 150, 160 are peered with another route reflector 17 and the two route reflectors 140, 170 are peered. A PE node 32 of another SPN 30 is connected to one of the route reflectors 170. Route reflector 140 has as client peer nodes the PE nodes 120, 130, and as non-client peer node the route reflector 170. Route reflector 170 has as client peer nodes the PE nodes 150, 160, as non-client peer node the route reflector 140 and as external peer node the PE node 32.

Figure 10:
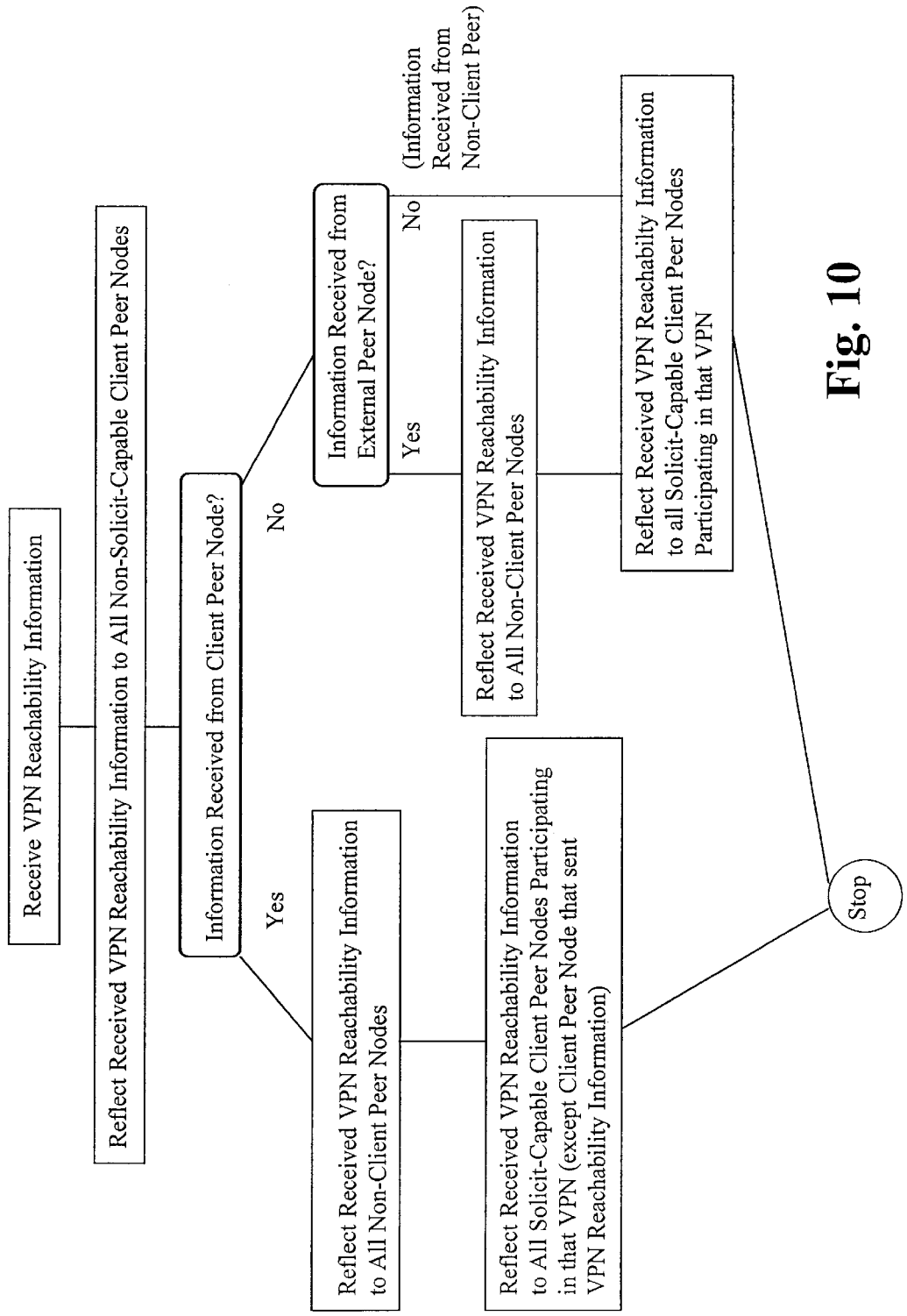
FIG. 10 is flow chart showing steps in a process performed by a route reflector on receipt of VPN reachability information.

FIG. 10 is flow chart showing steps in a process performed by the route reflector 170 on receipt of VPN reachability information. If the VRI is received from one of the client peer nodes 150, the route reflector 170 forwards the received VRI to its non-client peer node 140 and to its other client peer node 160 provided that the other client peer node 160 is either a non-solicit-capable node or a solicit-capable node that is currently participating in that VPN. If the VRI is received from the external peer node 32, the route reflector 170 forwards the VRI to its non-client peer node 140 and to its client nodes 150, 160 if they are non-solicit-capable or if they are solicit-capable and currently participating in that VPN. If the VRI is received from the non-client peer 140, the route reflector forwards the VRI to its client nodes 150, 160 if they are non-solicit-capable or if they are solicit-capable and currently participating in that VPN.

BGP route reflectors which do not support solicitation operate in a conventional manner. BGP route reflectors which support solicitation according to an embodiment of the invention operates as follows.

Each route reflector keeps track of the VPN associated with each of its SC-Client peers. When a route is received by a route reflector, it selects the best path based on its path selection rule.

After the best path is selected, it does the following depending on the type of peer it is receiving the best path from:

1) A route from a Non-Client peer
   reflect to all SC-Client peers in the same VPN, and
   reflect to all NSC-Client peers;
2) A route from a Client peer
   reflect to all Non-Client peers, and
   reflect to SC-Client peers in the same VPN other than the originator, and
   reflect to all NSC-Client peers other than the originator;
3) A route from an EBGP peer
   reflect to all Non-Client peers, and
   reflect to SC-Client peers in the same VPN, and
   reflect to all NSC-Client peers.

Figure 11:
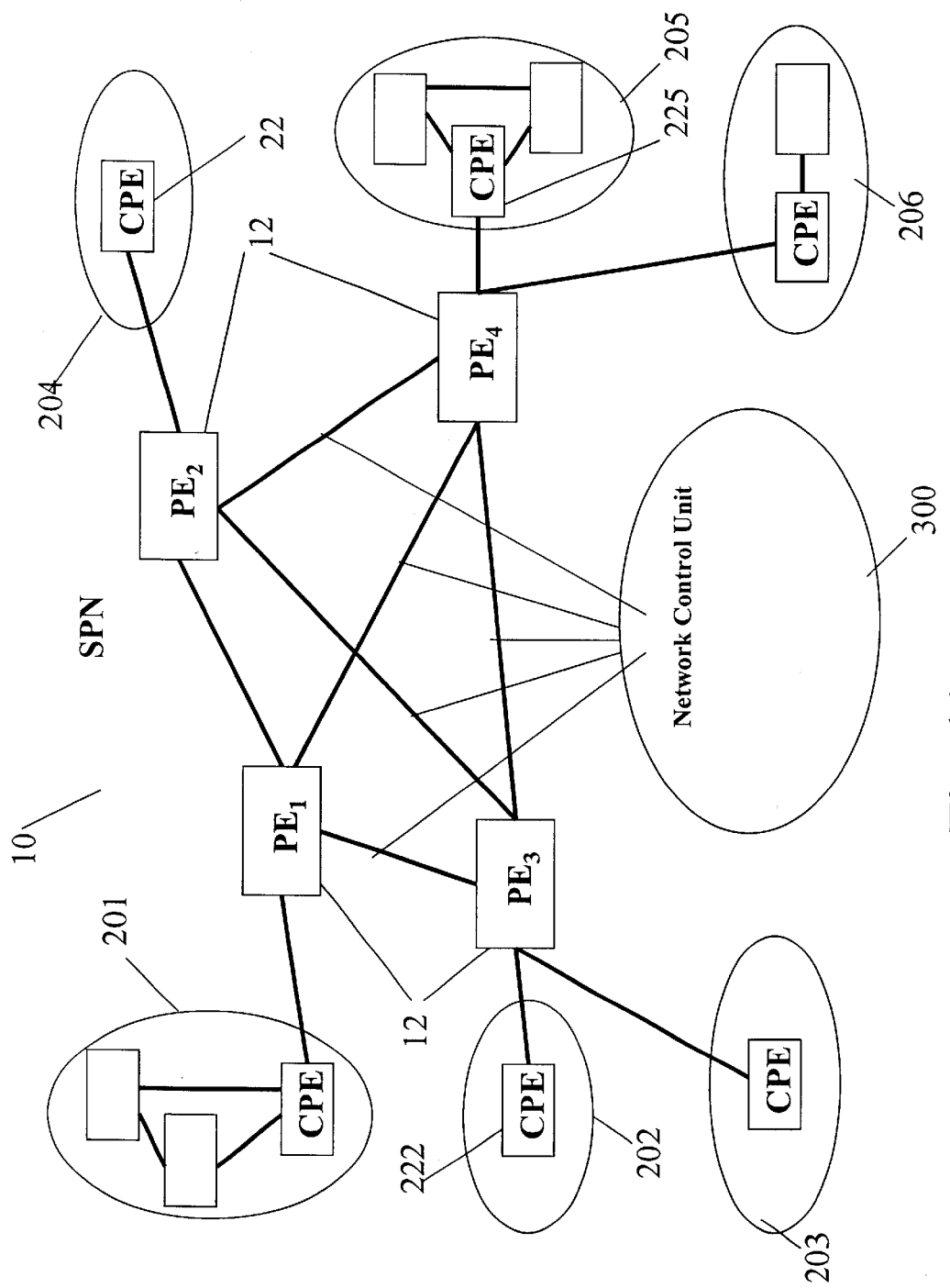
FIG. 11 is a block schematic diagram of a data network embodying a third implementation of the invention.

FIG. 11 is a block schematic diagram of a data network according to an alternative embodiment of the invention.

This figure is similar to FIG. 1, but includes a network control unit (NCU) 300 which has connections to each of the PE nodes in the SPN. An NCU is a device or set of devices that are network connected which consist of a database of information relevant to other devices in the network and a mechanism to communicate the relevant information to the other devices over the network. Advantageously, the NCU is used to facilitate the solicitation methods described above without requiring any changes to the CPEs. In this example, the NCU can comprise a server (for example a workstation or dedicated hardware), which includes a processor, and memory for storing instructions for storing VPN information on a per CPE basis for each PE and for communicating this information and status changes to each PE.

Figure 12:
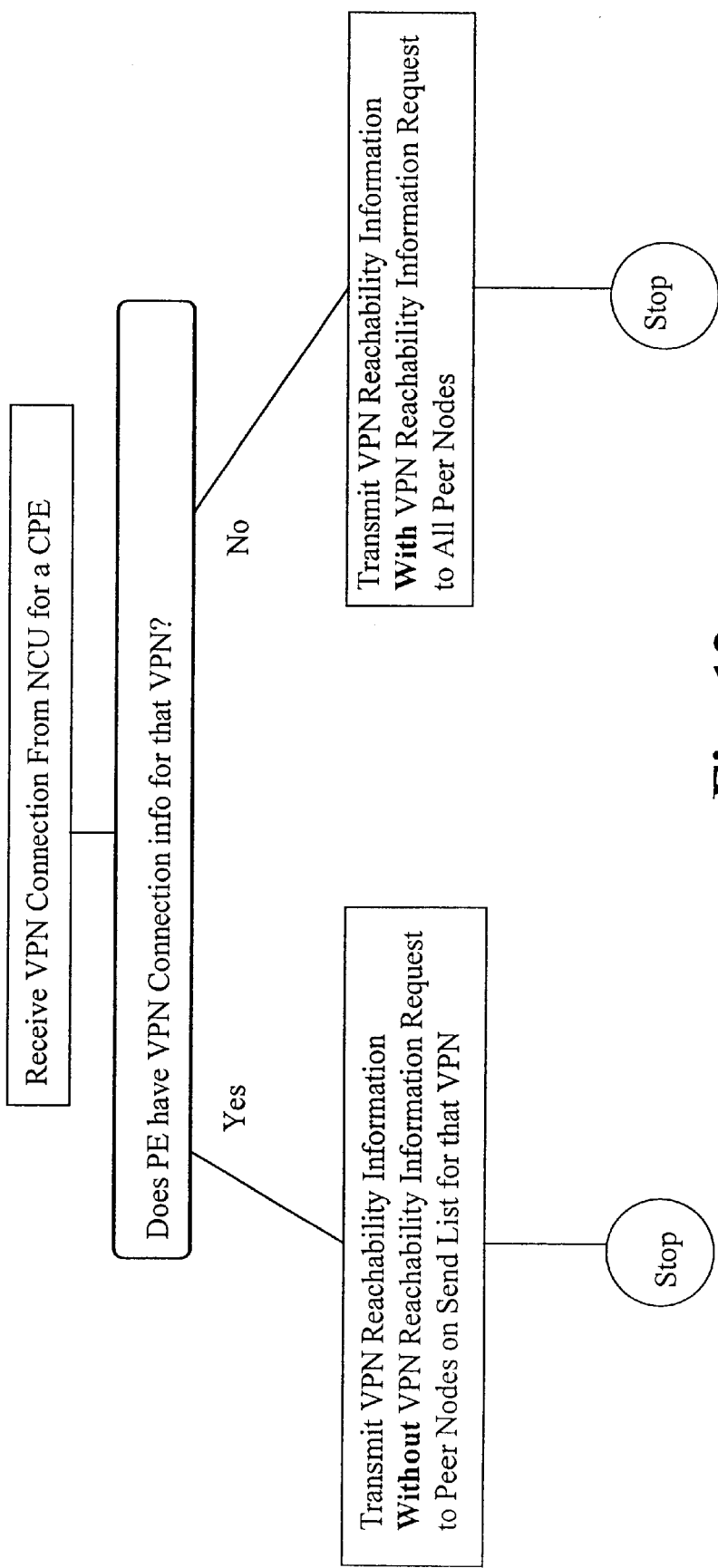
FIG. 12 is a flow chart showing steps in a process performed by a solicit-capable PE node on receipt of a VPN connection information from NCU.

FIG. 12 is a modified version of FIG. 2 for use with the embodiment of FIG. 11. Note the process steps for FIGS. 3 to 8 are similar, but information regarding changes in CPE connections originates from the NCV. Furthermore, the NCV can be used with an SPN which includes route reflectors.

The embodiments of the invention described above may be modified without departing from the broad principles of the invention.

For example, the order of some steps in some of the processes described above may be interchanged without appreciably altering their effect.

The format of the VRI request may be altered without departing from the principles of the invention. In the embodiment described above, the VRI request is implemented as a flag in a VRI distribution message sent by a PE node to inform peer nodes that a CPE has registered for VPN participation at the sending PE node. Alternatively, the VRI request could take the form of a separate VRI request message.

These and other modifications of the embodiments described above are intended to be within the scope of the invention as defined by the claims which follow.

What is claimed is:

1. A method for distributing VPN reachability information in a data network, comprising:

soliciting VPN reachability information by transmitting a VPN reachability information request from a requesting node of the data network to another node of the data network, the VPN reachability information request comprising a VPN identifier;

receiving the VPN reachability information request at said other node of the data network;

retrieving VPN reachability information associated with the VPN identifier at said other node, the retrieved VPN reachability information comprising a subset of all VPN reachability information;

transmitting the retrieved VPN reachability information from said other node to the requesting node; and receiving the transmitted VPN reachability information at the requesting node.

2. A method for acquiring VPN reachability information at a node of a data network, comprising:

soliciting VPN reachability information by transmitting a VPN reachability information request from the node, the VPN reachability information request comprising a VPN identifier; and receiving the VPN reachability information at the node, the received VPN reachability information comprising a subset of all VPN reachability information.

3. A method as defined in claim 2, wherein the VPN reachability information request further comprises VPN reachability information supplied by the requesting node, the supplied VPN reachability information designating customer network addresses that may be reached via the VPN.

4. A method as defined in claim 3, wherein the VPN reachability information request is generated in response to a VPN connection request received by the requesting node from customer equipment connected to the requesting node.

5. A method for acquiring VPN reachability information at a node of a data network, comprising:

transmitting a VPN reachability information request from the node, the VPN reachability information request comprising a VPN identifier;

receiving VPN reachability information at the node;

storing at the node VPN reachability information received from a solicit-capable node only if the VPN reachability information is associated with a VPN in which the node is participating; and storing at the node all VPN reachability information received from a non-solicit-capable node.

6. A method as defined in claim 2, further comprising:

transmitting a VPN withdraw message from the node when equipment connected to the node ceases participation in a particular VPN, the VPN withdraw message comprising a VPN identifier identifying the particular VPN.

7. A method for providing VPN reachability information at a node of a data network, comprising:

receiving a VPN reachability information request at the node, the VPN reachability information request comprising a VPN identifier;

retrieving VPN reachability information associated with the VPN identifier at the node, the retrieved VPN reachability information comprising a subset of all VPN reachability information; and transmitting the retrieved VPN reachability information from the node.

8. A method as defined in claim 7, wherein VPN reachability information is received with the VPN reachability information request, further comprising:

transmitting the received VPN reachability information to customer premises equipment connected to the node and participating in a VPN associated with the VPN identifier of the VPN reachability information request.

9. A method as defined in claim 7, further comprising:

receiving a VPN withdraw message from another node; and deleting stored VPN reachability information specified in the VPN withdraw message.

10. A method for distributing VPN reachability information in a data network, comprising:

maintaining at a node of the data network a VPN send list for each VPN in which the node currently participates, the VPN send list for a particular VPN identifying peer nodes of the node which also participate in that particular VPN; and upon receipt of VPN reachability information for the particular VPN, transmitting that VPN information only to peer nodes on the VPN send list for the particular VPN.

11. A method as defined in claim 10, further comprising:

receiving VPN reachability information for a particular VPN at the node from a peer node; and adding that peer node to the VPN send list for the particular VPN if that peer node is not already on the VPN send list for the particular VPN.

12. A method as defined in claim 10, further comprising:
receiving a VPN withdraw message for particular equipment registered on a particular VPN at the node from a peer node; and
deleting the peer node from the VPN send list for the particular VPN if the peer node has no other equipment currently registered for participation in the particular VPN.

13. A method as defined in claim 10, further comprising:
receiving a VPN disconnect request for a particular VPN at the node from equipment connected to the PE node; and
deleting the VPN send list for the particular VPN if the node has no other equipment currently registered for participation in the particular VPN.

14. A data network, comprising a plurality of nodes, each node comprising:
means for soliciting VPN reachability information by transmitting a VPN reachability information request to another node of the data network, the VPN reachability information request comprising a VPN identifier;
means for receiving a VPN reachability information request from another node of the data network;
means for retrieving VPN reachability information associated with a VPN identifier in a received VPN reachability information request, the retrieved VPN reachability information comprising a subset of all VPN reachability information;
means for transmitting the retrieved VPN reachability information to another node of the data network; and
means for receiving VPN reachability information from another node of the data network.

15. A node for a data network, comprising:
means for soliciting VPN reachability information by transmitting a VPN reachability information request, the VPN reachability information request comprising a VPN identifier; and
means for receiving the VPN reachability information, the received VPN reachability information comprising a subset of all VPN reachability information.

16. A node as defined in claim 15, further comprising:
means for receiving VPN reachability information supplied by the requesting node; and
means for transmitting the received VPN reachability information.

17. A node for a data network, comprising:
means for transmitting a VPN reachability information request, the VPN reachability information request comprising a VPN identifier;
means for receiving VPN reachability information;
means for storing at the node VPN reachability information received from a solicitation-capable node only if the VPN reachability information is associated with a VPN in which the node is participating; and
means for storing at the node all VPN reachability information received from a non-solicitation-capable node.

18. A node as defined in claim 15, further comprising:
means for transmitting a VPN withdraw message from the node when equipment connected to the node ceases participation in a particular VPN, the VPN withdraw message comprising a VPN identifier identifying the particular VPN.

19. A node of a data network, comprising:
means for receiving a VPN reachability information request, the VPN reachability information request comprising a VPN identifier;
means for retrieving VPN reachability information associated with the VPN identifier, the retrieved VPN reachability information comprising a subset of all VPN reachability information; and
means for transmitting the retrieved VPN reachability information.

20. A node as defined in claim 19, further comprising:
means for transmitting VPN reachability information received with the VPN reachability information request to customer premises equipment connected to the node and participating in a VPN associated with the VPN identifier of the VPN reachability information request.

21. A node as defined in claim 19, further comprising:
means for receiving a VPN withdraw message from another node; and
means for deleting stored VPN reachability information specified in the VPN withdraw message.

22. A node for a data network, comprising:
means for maintaining a VPN send list for each VPN in which the node currently participates, the VPN send list for a particular VPN identifying peer nodes of the node which also participate in that particular VPN; and
means for transmitting that VPN information only to peer nodes on the VPN send list for the particular VPN upon receipt of VPN reachability information for the particular VPN.

23. A node as defined in claim 22, further comprising:
means for receiving VPN reachability information for a particular VPN from a peer node; and
means for adding that peer node to the VPN send list for the particular VPN if that peer node is not already on the VPN send list for the particular VPN.

24. A node as defined in claim 22, further comprising:
means for receiving a VPN withdraw message for particular equipment registered on a particular VPN at the PE node from a peer node; and
means for deleting the peer node from the VPN send list for the particular VPN if the peer node has no other equipment currently registered for participation in the particular VPN.

25. A node as defined in claim 22, further comprising:
means for receiving a VPN disconnect request for a particular VPN from equipment connected to the node; and
means for deleting the VPN send list for the particular VPN if the node has no other equipment currently registered for participation in the particular VPN.

26. A PE node, comprising:
connections to peers;
links to other nodes, said other nodes associated with particular VPNs;
a first data structure of links for each VPN; and
a second data structure comprising a send list database, an adj-RIB-Out database and an adj-RIB-In database for each VPN.

27. A computer-readable medium containing a computer program that when loaded into a node of a data network, the node comprising hardware and software and for establishing connections to one or more other nodes, instructs the node to distribute VPN reachability information according to the steps of:
receiving a VPN reachability information request at the node, the VPN reachability information request comprising a VPN identifier;

retrieving VPN reachability information associated with the VPN identifier at the node, the retrieved VPN reachability information comprising a subset of all VPN reachability information; and transmitting the retrieved VPN reachability information from the node.

28. A computer-readable medium containing a computer program that when loaded into a node of a data network, the node comprising hardware and software and for establishing connections to one or more other nodes, instructs the node to distribute VPN reachability information according to the steps of:

maintaining at a node of the data network a VPN send list for each VPN in which the node currently participates, the VPN send list for a particular VPN identifying peer nodes of the node which also participate in that particular VPN; and upon receipt of VPN reachability information for the particular VPN, transmitting that VPN information only to peer nodes on the VPN send list for the particular VPN.

* * * * *